US012694105B2

(12) United States Patent (10) Patent No.: US 12,694,105 B2
Bamberg et al. (45) Date of Patent: Jul. 28, 2026

(54) WATCH CLOCKING TO IMPROVE SECURITY OF LOW POWER PROCESSING SYSTEMS

(71) Applicant: NXP B.V., Eindhoven (NL)

(72) Inventors: Lennart Janis Bamberg, Hamburg (DE); Graham Henry MacGregor Stout, Glasgow (GB)

(73) Assignee: NXP B.V., Eindhoven (NL)

( * ) Notice: Subject to any disclaimer, the term of this patent is extended or adjusted under 35 U.S.C. 154(b) by 38 days.

(21) Appl. No.: 18/956,857

(22) Filed: Nov. 22, 2024

(65) Prior Publication Data

US 2026/0147879 A1 May 28, 2026

(51) Int. Cl.
| | |
|---|---|
| *G06F 21/55* | (2013.01) |
| *G06F 1/04* | (2006.01) |
| *G06F 1/3203* | (2019.01) |
| *G06F 1/3287* | (2019.01) |
| *G06F 21/70* | (2013.01) |
| *G06F 21/81* | (2013.01) |

(52) U.S. Cl.
CPC .............. *G06F 21/554* (2013.01); *G06F 1/04* (2013.01); *G06F 1/3203* (2013.01); *G06F 1/3287* (2013.01); *G06F 21/70* (2013.01); *G06F 21/81* (2013.01); *G06F 2221/034* (2013.01)

(58) Field of Classification Search
CPC ........ G06F 21/554; G06F 21/70; G06F 21/81; G06F 1/3203; G06F 1/3287; G06F 1/04; G06F 2221/034
USPC .......................................................... 726/23
See application file for complete search history.

(56) References Cited

U.S. PATENT DOCUMENTS

| | | | | |
|---|---|---|---|---|
| 10,761,559 | B2 | 9/2020 | Zerwick | |
| 2002/0038433 | A1* | 3/2002 | Dalrymple | ............ G06F 1/3203 |
| | | | | 713/322 |
| 2003/0079152 | A1* | 4/2003 | Triece | ................... G06F 1/3203 |
| | | | | 713/322 |
| 2004/0199803 | A1* | 10/2004 | Suzuki | .................. G06F 1/3203 |
| | | | | 713/400 |

(Continued)

OTHER PUBLICATIONS

Lagasse, Jacqueline et al. "Combining Clock and Voltage Noise Countermeasures against Power Side-Channel Analysis." 2019 IEEE 30th International Conference on Application-Specific Systems, Architectures and Processors (ASAP) pp. 214-217. Downloaded Nov. 20, 2023 from IEEE Xplore.

*Primary Examiner* — Thanh T Le

(57) ABSTRACT

A processing system including a peripheral configured to store security information and having a clock input receiving a gated clock, a watch clock generator configured to generate a watch clock that has a reduced duty cycle relative to a system clock, and clock control circuitry configured to select the system clock as the gated clock during normal operation of the peripheral and to select the watch clock as the gated clock during a low power mode of the peripheral. The watch clock generator may include a counter that counts system clock cycles and clock pulse selector, such as a modulo circuit, configured to select cycles of the system clock for generating the watch clock. For multiple peripherals, delay circuitry may skew a watch clock between two or more peripherals. Multiple watch clocks with different delayed duty cycles may be generated, each for a corresponding one of multiple groups of peripherals.

16 Claims, 6 Drawing Sheets

(56)         References Cited

U.S. PATENT DOCUMENTS

| | | | |
|---|---|---|---|
| 2004/0210780 A1* | 10/2004 | Takahashi | G06F 1/10 |
| | | | 713/300 |
| 2006/0030358 A1* | 2/2006 | Kappes | H03B 5/06 |
| | | | 455/556.1 |
| 2006/0220697 A1* | 10/2006 | Flynn | H03K 23/68 |
| | | | 327/105 |
| 2009/0083571 A1* | 3/2009 | Cho | G06F 1/324 |
| | | | 713/601 |
| 2009/0089599 A1* | 4/2009 | Westwick | G06F 1/3243 |
| | | | 323/283 |
| 2010/0091923 A1* | 4/2010 | Haentzschel | H04W 52/0287 |
| | | | 375/355 |
| 2011/0115567 A1 | 5/2011 | Sutardja | |
| 2011/0202788 A1 | 8/2011 | Hesse et al. | |
| 2014/0089712 A1 | 3/2014 | Machnicki et al. | |
| 2015/0067363 A1* | 3/2015 | Jouin | G06F 1/06 |
| | | | 713/320 |
| 2019/0079573 A1* | 3/2019 | Hanson | G11C 5/147 |
| 2019/0196563 A1* | 6/2019 | Lai | G06F 1/324 |

* cited by examiner

WATCH CLOCKING TO IMPROVE SECURITY OF LOW POWER PROCESSING SYSTEMS

BACKGROUND

Field

The present disclosure relates in general to secure processing systems, and more particularly to watch clocking to protect against attack of blocks containing security information in low power processing systems.

Description of the Related Art

Modern security systems require both security and low power, such as, for example a secure element (SE) used in a watch application. Conventional systems often simply halt the clock signal supplied to unused or suspended peripherals to reduce power consumption. The unused peripherals, however, often store security information. The security challenge is that these un-clocked peripherals may contain sensitive security information, such as in the form of one or more security keys, security tokens, passwords, authorization or authentication information, etc., which are susceptible to attack during low power modes. Each peripheral with security information may be protected against bit-flip attacks by a corresponding error-detection code (EDC). The EDC errors are typically latched in a flip-flop or latch or the like from where the error response is triggered. When one or more peripherals of a system are placed in low power mode by temporarily stopping the clock signal provided to those peripherals, however, any errors of those peripherals are no longer captured or detected until after the clock is reactivated. Assuming that the clock is deactivated long enough, attackers may have sufficient time to flip multiple bits of keys or other security information within one or more peripherals to obtain access. In addition, other security mechanisms that might otherwise protect against an attack can be disabled while the clock is suspended.

Furthermore, when a security attack is detected, it may require multiple clocks to propagate the error to a security exception handler of the system. If the peripheral clock is not restarted, then a security attack of that peripheral might not be detected. Although it is possible to reduce or minimize the security risk by maintaining the system clock to each peripheral that contains secure information, the competing benefit of reducing power consumption is also reduced or minimized.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

A watch clock system as described herein avoids the security risks of conventional low power processing system configurations in which peripherals containing security information (referred to herein as "security peripherals") remain un-clocked for long periods of time during a low power mode. Instead, the watch clock system clocks the peripheral at a much-reduced programmable duty cycle during the low power mode, such as, for example, by a factor of 100 or more. The term "peripheral" as used herein refers to any functional circuitry block or module that performs corresponding functions including security functions of a processing system. The watch clock system ensures that errors are clocked through to the top system level while only adding minimal additional power. When the processing system includes multiple security peripherals, a separate watch clock signal may be provided to each peripheral, or the peripherals may be subdivided into groups, each group receiving a corresponding one of multiple watch clock signals.

The watch clock system may be configured to skew the reduced duty cycle watch clocks provided to multiple peripherals. A drawback of uniform or integral reduced clocking is that it may cause peaks in the power consumption during times at which the clock to multiple peripherals rises, such as when multiple flip-flops are triggered simultaneously. Simultaneous clocking also enables a potential physical attack surface as it allows an attacker to synchronize attacks to the synchronized clocking which would otherwise be visible in the power profile. Instead, synchronous attacks are thwarted by skewing the watch clock for different peripherals through simple shift registers or the like.

In addition, the watch clock process may be applied external to, and thus requires no internal changes to, any legacy peripheral including security information. Hence, the watch clock system may be installed with low complexity within an otherwise complex system. By adding a duty cycle configuration register or the like, the security software programmer can easily trade off the speed of reaction to an error versus power consumption. The watch clock addition may further be extended by including simple circuitry or logic that automatically detect when a peripheral is unused such that the clocking can be switched from an active clock strategy to the watch clock strategy imposed by the watch clock system.

In summary, a secure low power processing system may achieve power-reduction at a low complexity while maintaining security of peripherals storing secure information.

The watch clock system may be applied to legacy or external systems as it does not require internal modification. Thus, the watch clock system is simple to install and configure in any system including complex systems with multiple security peripherals. The watch clock system may be installed external to peripherals without requiring internal changes or modifications.

Figure 1:
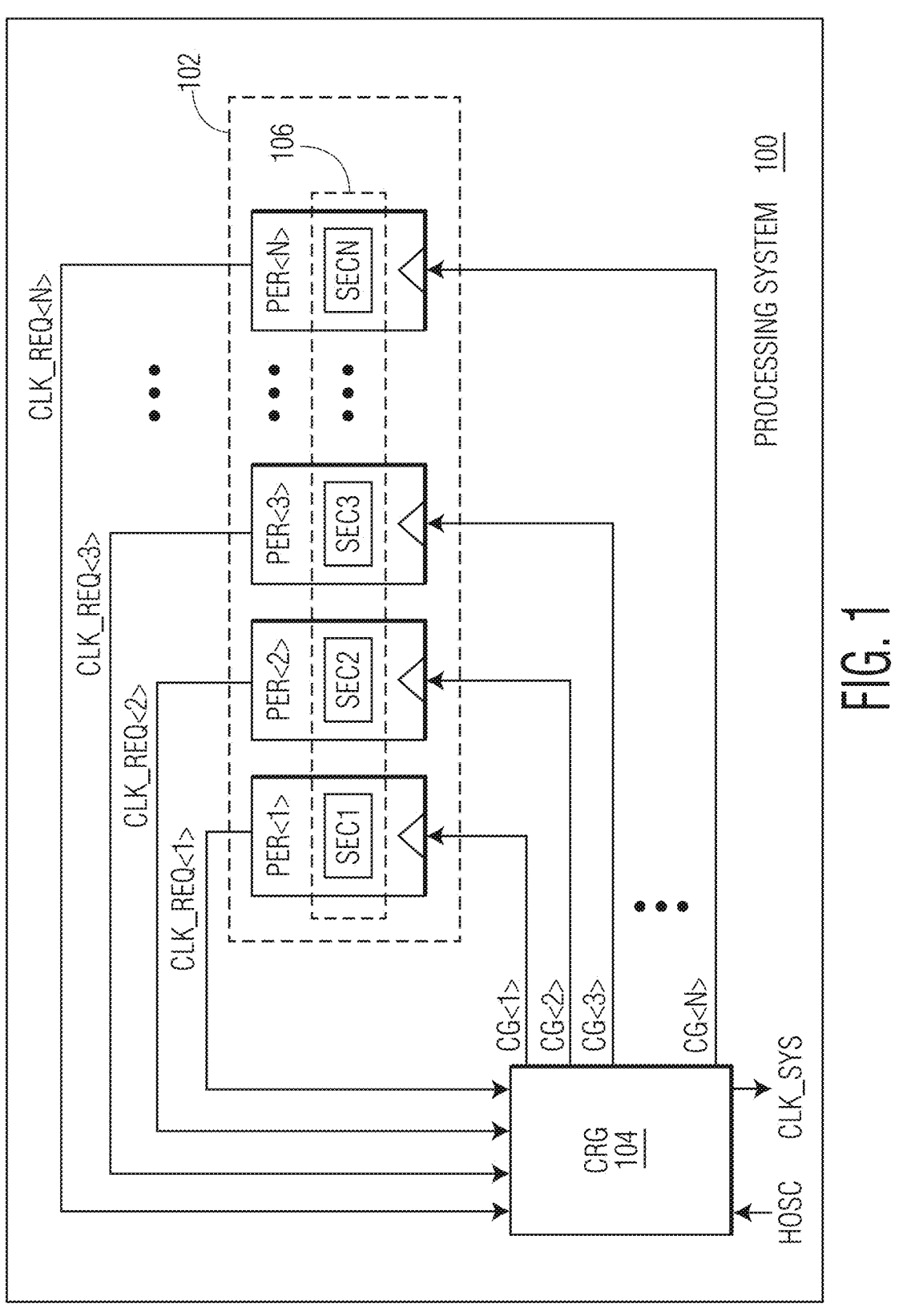
FIG. 1 is a simplified block diagram of selected portions of a processing system including watch clocking implemented according to one embodiment.

FIG. 1 is a simplified block diagram of selected portions of a processing system 100 including watch clocking implemented according to one embodiment. The processing system 100 includes N peripheral blocks 102, individually labeled PER<1>, PER<2>, PER<3>, . . . , PER<N>, and a clock and reset generator (CRG) 104. Although 4 peripheral blocks 102 are shown (1, 2, 3, . . . , N), it is understood that N may be less than 4 and may even be one in which only one peripheral block 102 is included. Additional components and devices may be included but are not shown, such as one or more processing devices which may include one or more of processors, microprocessors, microcontrollers, etc., and any other supporting circuitry. The additional components may implement a top level system (not shown) including a security exception handler for detecting security attacks or other security issues that may need to be resolved. The processing system 100 may be implemented as discrete components or according to a system-on-chip (SoC) configuration or the like.

Each of the N peripheral blocks 102 may include security information (SEC) 106, individually labeled SEC1, SEC2, SEC3, . . . , SECN, in which each instance of security information 106 includes sensitive information, such as one or more security keys, security tokens, passwords, authorization or authentication information, etc. Although each of the peripheral blocks 102 is shown including corresponding security information 106 for purposes of illustration, it is understood that other peripheral blocks (not shown) or even one or more of the illustrated peripheral blocks 102 may not include security information 106.

Each of the peripheral blocks 102 includes a clock input receiving a corresponding gated clock (CG) signal from the CRG 104. As shown, a gated clock signal CG<1> is provided to PER<1>, a gated clock signal CG<2> is provided to PER<2>, a gated clock signal CG<3> is provided to PER<3>, and so on up to a gated clock signal CG<N> provided to PER<N>. Each of the peripheral blocks 102 may also have an output providing a corresponding clock request (CLK_REQ) signal to the CRG 104, individually shown as CLK_REQ<1>, CLK_REQ<2>, CLK_REQ<3>, . . . , CLK_REQ<N>. The CRG 104 receives a host oscillation (HOSC) signal and generates a system clock CLK_SYS, in which each of the CG signals may be a copy of or otherwise be derived from CLK_SYS as further described herein.

The processing system 100 is configured to operate in a low power mode to conserve power. In a conventional configuration, when any one of the peripheral blocks 102 is not in use, the corresponding clock signal provided to the respective peripheral module 102 is disabled or otherwise turned off. Thus, when one or more of the peripheral blocks 102 are not in use, the power can be significantly reduced by stopping the clock to each of the unused and un-clocked peripheral blocks 102. One or more of the un-clocked peripheral blocks 102, however, may be or otherwise may include a security peripheral incorporating security information 106, which may be protected by error-detection codes (EDCs) or the like against bit-flip attacks. The EDC errors are typically latched in a flip-flop from where the error response is triggered. The problem with the conventional configuration is that when a peripheral block incorporating security information is un-clocked for a significant period of time, errors are no longer captured/detected until the clock is activated again. Assuming that the clock is deactivated long enough, this gives attackers the opportunity to flip multiple bits of the corresponding security information 106 in order to gain access to the security information 106. In addition, any other security mechanisms that may be incorporated can be disabled while the clock is stopped.

The CRG 104 is configured to clock selected ones up to all of the peripheral blocks 102 during low power mode using watch clock signals operating at a much-reduced duty cycle during watch clocking operation. This guarantees that any detected errors will be clocked through to the top system level at the expense of adding minimal additional power. In addition, multiple watch clock signals may be generated each programmed with a different frequency or cycle time suitable for one or more of the selected peripheral blocks 102. Thus, the selected peripheral blocks 102 may be separated into groups in which each group receives a corresponding one of multiple watch clock signals. In fact, a separate programmable watch clock generator may be provided for each peripheral block 102. Furthermore, the selected peripheral blocks 102 of each group are not necessarily clocked at the same time during watch clocking operation; instead, the watch clock signal for each group may be staggered or skewed from one peripheral to the next using delay circuitry or the like to minimize visibility in the power profile.

Figure 2:
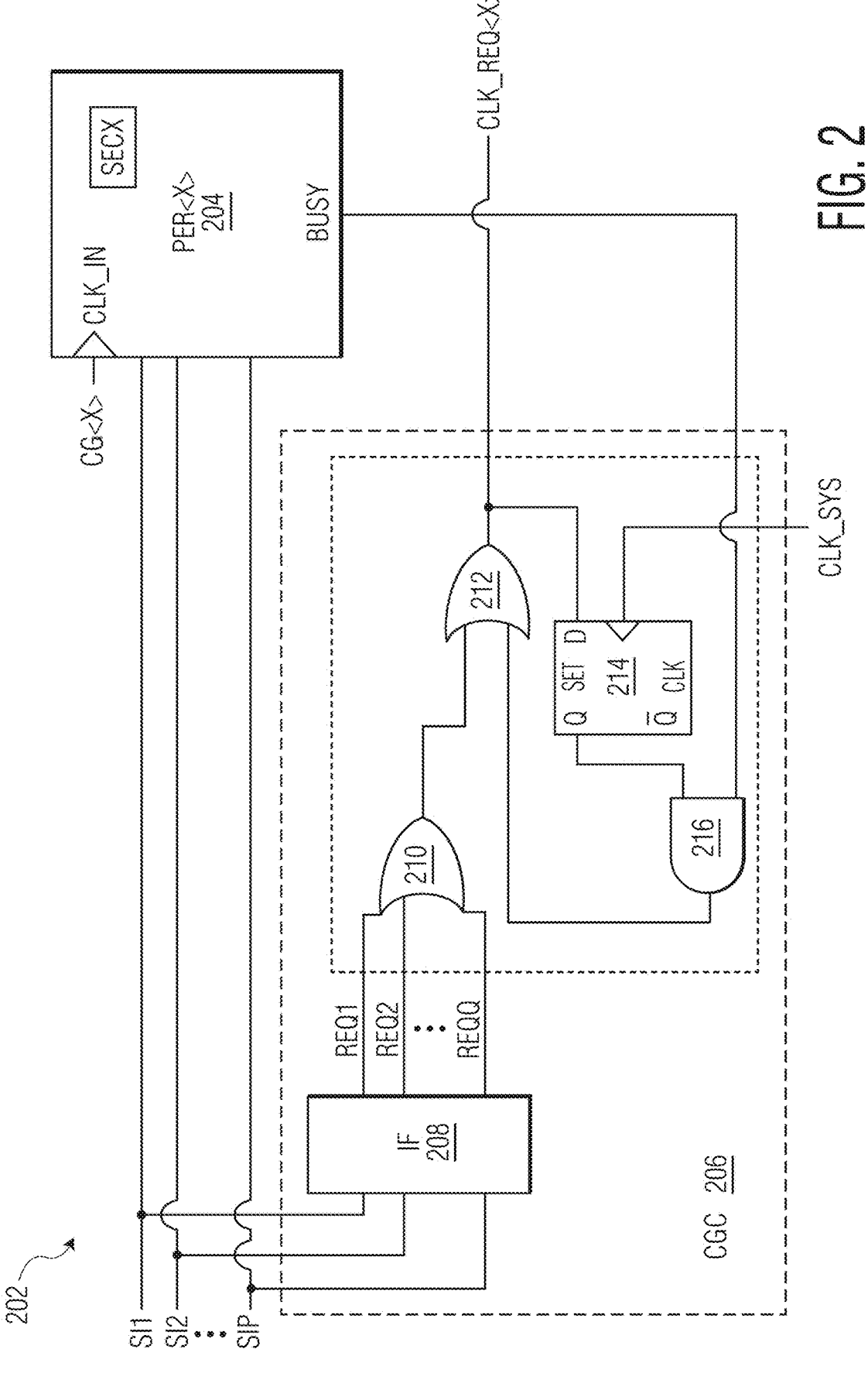
FIG. 2 is a simplified schematic and block diagram of an exemplary peripheral block implemented according to one embodiment which may be used to implement one or more up to all of the peripheral blocks of FIG. 1.

FIG. 2 is a simplified schematic and block diagram of an exemplary peripheral block 202 implemented according to one embodiment which may be used to implement one or more up to all of the peripheral blocks 102. The peripheral block 202 includes a peripheral module 204 and a clock gating circuit (CGC) 206. The peripheral module 204 is denoted PER<X> to represent the peripheral circuitry of any one of the peripheral blocks 102 incorporating security information denoted SECX, in which "X" is a number from 1 to N. The peripheral module 204 includes a clock input (CLK_IN) receiving a gated clock signal CG<X> which represents a respective one of the gated clocks CG. The peripheral module 204 has a set of P inputs receiving a respective one of P slave interface signals SI1, SI2, . . . , SIP, in which P is a number 1 or more. The peripheral module 204 includes a BUSY output that is asserted high when active and low when inactive.

The peripheral module 204 may be a legacy module that is copied or otherwise instantiated into the processing system 100 unmodified. The CGC 206 is added to detect activity on any one or more of the slave interface signals SI1-SIP and to assert a respective one of the clock request signals shown as CLK_REQ<X>. The CGC 206 includes a slave interface (I/F) 208, a Q-input Boolean logic OR gate 210, a 2-input Boolean logic OR gate 212, a D-type flip-flop (DFF) 214, and a 2-input Boolean logic AND gate 216. The P slave interface signals SI1-SIP are provided to respective inputs of the slave I/F 208, having Q outputs providing Q respective request signals REQ1, REQ2, . . . , REQQ to the Q inputs of the OR gate 210. It is noted that P and Q may be the same number or may be different numbers depending upon the implementation. The output of the OR gate 210 is provided to one input of the OR gate 212, having its other input coupled to the output of the AND gate 216 and having an output providing the clock request signal CLK_REQ<X>. The CLK_REQ<X> at the output of the OR gate 212 is provided to the D input of the DFF 214, having a clock input receiving CLK_SYS and having a non-inverting Q output coupled to one input of the AND gate

216. The BUSY output of the peripheral module 204 is coupled to the other input of the AND gate 216.

It is noted that each DFF shown in the Figures and referenced herein may generally be configured as any type of bistable multivibrator or "latch" having at least two stable digital states that can store information. Each DFF or latch is configured to change state by adjusting an input and applying one or more control inputs (e.g., set, reset, clear, clock, etc.). In the illustrated embodiments, each DFF latches its input to its output in response to a clock signal transition, although alternative configurations are possible and contemplated.

In operation of the peripheral block 202, when the peripheral module 204 is inactive and assuming that the slave interface signals SI1-SIP are also inactive, BUSY is low and CLK_REQ<X> is low and CG<X> is currently inactive. Activity on any one or more of the slave interface signals SI1-SIP is detected by the slave I/F 208, which asserts a corresponding one or more of the request signals REQ1-REQQ. In response, the OR gate 210 asserts its output high causing the OR gate 212 to assert CLK_REQ<X> high provided to a respective input of the CRG 104. The CRG 104 activates the corresponding gated clock CG<X> waking up the peripheral module 204, which becomes active and asserts BUSY high. Since CLK_REQ<X> and BUSY are both high, the AND gate 216 asserts its output high to keep CLK_REQ<X> high while the peripheral module 204 is active. When the peripheral module 204 completes the task at hand, it goes inactive back into a low power state and asserts BUSY back low. The AND gate 216 asserts its output back low, and assuming that the slave interface signals SI1-SIP are also inactive, CLK_REQ<X> is asserted back low and the CRG 104 deactivates the corresponding gated clock CG<X> for the low power mode.

Since the peripheral block 202 is shown including security information SECX, the CRG 104 is configured to provide a watch clock signal operating at a much-reduced duty cycle as CG<X> when the peripheral block 202 is placed into a low power mode. In this manner, rather than remaining un-clocked for an indefinite period of time during low power operation, the peripheral block 202 may achieve substantial power-reduction while also maintaining security of the secure information SECX.

Figure 3:
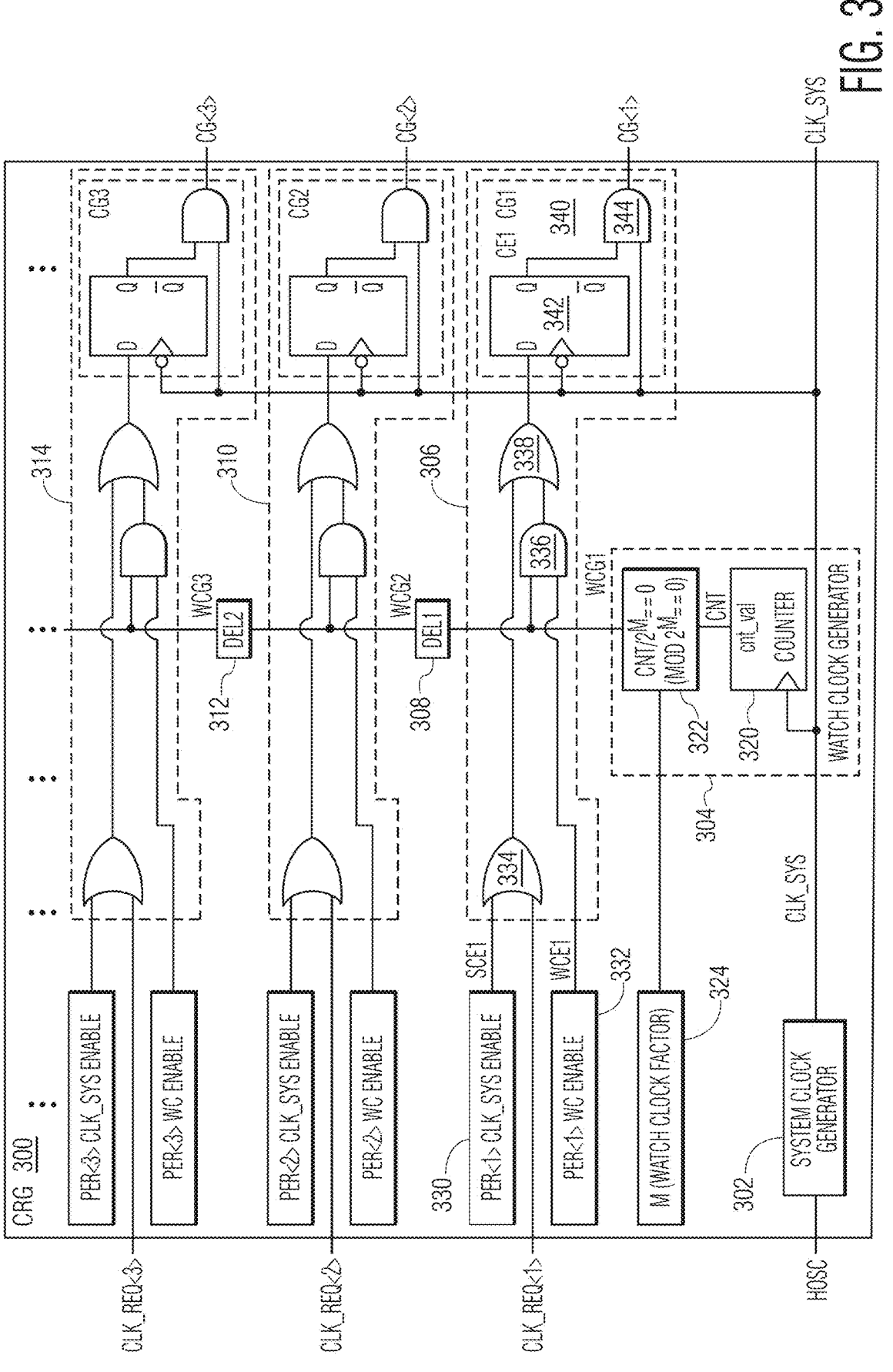
FIG. 3 is a simplified schematic and block diagram of a clock and reset generator (CRG) implemented according to one embodiment which may be used as the CRG of FIG. 1.

FIG. 3 is a simplified schematic and block diagram of a clock and reset generator (CRG) 300 implemented according to one embodiment which may be used as the CRG 104. The host oscillator signal HOSC is provided to an input of a system clock generator 302 which outputs the system clock signal CLK_SYS. CLK_SYS is provided to an input of a watch clock generator 304, which outputs a first watch clock gate (WCG1) signal to an input of a clock control circuit 306 for the peripheral block PER<1>. The clock control circuit 306 receives the clock request signal CLK_REQ<1> from the peripheral block PER<1> and outputs the gate clock signal CG<1> to the peripheral block PER<1>. WCG1 is also provided to an input a delay circuit 308, which delays WCG1 by a first delay value DEL1 to provide a second watch clock gate (WCG2) signal, in which WCG2 is a delayed version of WCG1. WCG2 is provided to an input of a clock control circuit 310 for the peripheral block PER<2>, which receives the clock request signal CLK_REQ<2> from the peripheral block PER<2> and outputs the gate clock signal CG<2> to the peripheral block PER<2>. WCG2 is also provided to an input a delay circuit 312, which delays WCG2 by a second delay value DEL2 to provide a third watch clock gate (WCG3) signal, in which WCG3 is a delayed version of WCG2. WCG3 is provided to an input of a clock control circuit 314 for the peripheral block PER<3>, which receives the clock request signal CLK_REQ<3> from the peripheral block PER<3> and outputs the gate clock signal CG<3> to the peripheral block PER<3>. Additional clock control circuitry and delay circuits may be included in similar manner to provide gated clock signals for each of the peripheral blocks 102.

In one embodiment, the watch clock generator 304 includes a counter 320 and a modulo (MOD) circuit 322. The counter 320 counts cycles of CLK_SYS and provides a count value CNT to an input of the MOD circuit 322, which provides the WCG1 signal. A programmable register 324 stores a watch clocking factor M, which is provided to another input of the MOD circuit 322. As described further herein, 1 watch clock pulse is provided for every $2^M$ clock pulses of CLK_SYS. The counter 320 may be configured as an R-bit circular counter providing CNT as a R-bit value (in which R is an integer number), which counts cycles of CLK_SYS from CNT=0 to CNT=$2^R$-1, wraps back to 0 and repeats in successive cycles. For R=8, for example, CNT counts up from CNT=00000000b (in which an appended "b" denotes a binary value) to CNT=11111111b, wraps back to 00000000b in the next CLK_SYS cycle, and repeats. The MOD circuit 322 asserts WCG1 high when CNT/$2^M$=0 and otherwise negates WCG1 low. For example, for M=3, WCG1 goes high when CNT=00000000b, 00001000b, 00010000b, 00011000b, and so on. In other words, WCG1 is asserted high for one CLK_SYS cycle when the least-significant bits (LSB) of CNT=000b.

It is noted that the programmable register 324 and other programmable registers shown in the Figures and referenced herein (e.g., programmable registers 330 and 332 in FIG. 3, and programmable registers 502, 510, 512, 524, 526, 530, 538, 540, 554, and 556 in FIG. 5) may each be implemented in an alternative manner, such as any other suitable type of programmable memory or storage component.

The clock control circuit 306 includes Boolean logic 2-input OR gates 334 and 338, a Boolean logic 2-input AND gate 336, and a first clock gate (CG1) 340. The CG1 340 includes a DFF 342 and another 2-input AND gate 344. The register 330 stores a CLK_SYS enable value and outputs a corresponding system clock enable signal SCE1 to one input of the OR gate 334. The register 332 stores a watch clock (WC) enable value for the peripheral block PER<1> and outputs a corresponding watch clock enable signal WCE1 to one input of the AND gate 336. CLK_REQ<1> is provided to the other input of the OR gate 334, having its output coupled to the one input of the OR gate 338. WCG1 is provided to the other input of the AND gate 336, having its output coupled to the other input of the OR gate 338. The output of the AND gate 338 is coupled to the D input of the DFF 342. CLK_SYS is provided to one input of the AND gate 344 and to an inverting clock input of the DFF 342, having its non-inverting Q output providing a clock enable signal CE1 to the other input of the AND gate 344. The output of the AND gate 344 provides the gated clock signal CG<1>. Although not specifically described, each of the other clock control circuits 310, 314, etc., are configured in substantially the same manner as the clock control circuit 306, in which additional programmable registers are included for storing respective CLK_SYS and watch clock enable signals in a similar manner as the registers 330 and 332. Each of the other clock control circuits 310, 314, etc., receive the respective clock request, enable signals, and delayed watch clock gate signals and provide corresponding gated clock signals CG<2>, CG<3>, etc.

Operation of the clock control circuit 306 is as follows. When the register 330 is programmed to enable CLK_SYS for the peripheral PER<1> (e.g., by storing a logic "1" in the register 300), SCE1 is high so that the outputs of the OR gates 334 and 338 are asserted high pulling the D input of the DFF high. After one cycle of CLK_SYS (e.g., after CLK_SYS is next asserted low), the DFF 342 asserts CE1 high which stays high for so long as the register 330 is programmed to enable CLK_SYS for PER<1>. In this case, the AND gate 344 asserts CG<1> to follow CLK_SYS in subsequent cycles. Thus, when CLK_SYS is enabled in this manner, CLK_SYS is effectively provided as the gated clock signal CG<1> to the clock input of the peripheral PER<1>.

The register 330 may be programmed to disable CLK_SYS for the peripheral PER<1> (e.g., by storing a logic "0" in the register 300) so that SCE1 is low, such as, for example, during a low power mode. With reference back to FIG. 2, if PER<1> is configured in a similar manner as the peripheral block 202 including the CGC 206, and if CLK_REQ<X>=CLK_REQ<1> is asserted high in response to a slave signal or the like, then CE1 is asserted high (via OR gates 334 and 338 and DFF 342) for so long as the clock request signal remains asserted high. In this case, operation in response to the corresponding clock request signal CLK_REQ<1> being asserted is similar as the case in which SCE1 is high, so that CLK_SYS is effectively provided as the gated clock signal CG<1> to the clock input of the peripheral PER<1> for so long as CLK_REQ<1> remains high.

The register 332 may be programmed to enable watch clocking for the peripheral PER<1> (e.g., by storing a logic "1" in the register 332) so that WCE1 is pulled high. In this manner, when the register 330 is programmed to disable CLK_SYS so that SCE1 is low and while CLK_REQ<1> remains low during a low power mode, WCE1 holds one input of the AND gate 336 high to enable watch clocking for the peripheral PER<1>. In this case while WCE1 is high, one clock pulse of CLK_SYS is output on the gated clock signal CG<1> each time WCG1 goes high for one cycle of CLK_SYS. The watch clocking factor M determines the rate of watch clock pulses relative to CLK_SYS, in which 1 watch clock pulse occurs for every $2^M$ clock pulses of CLK_SYS.

Figure 4:
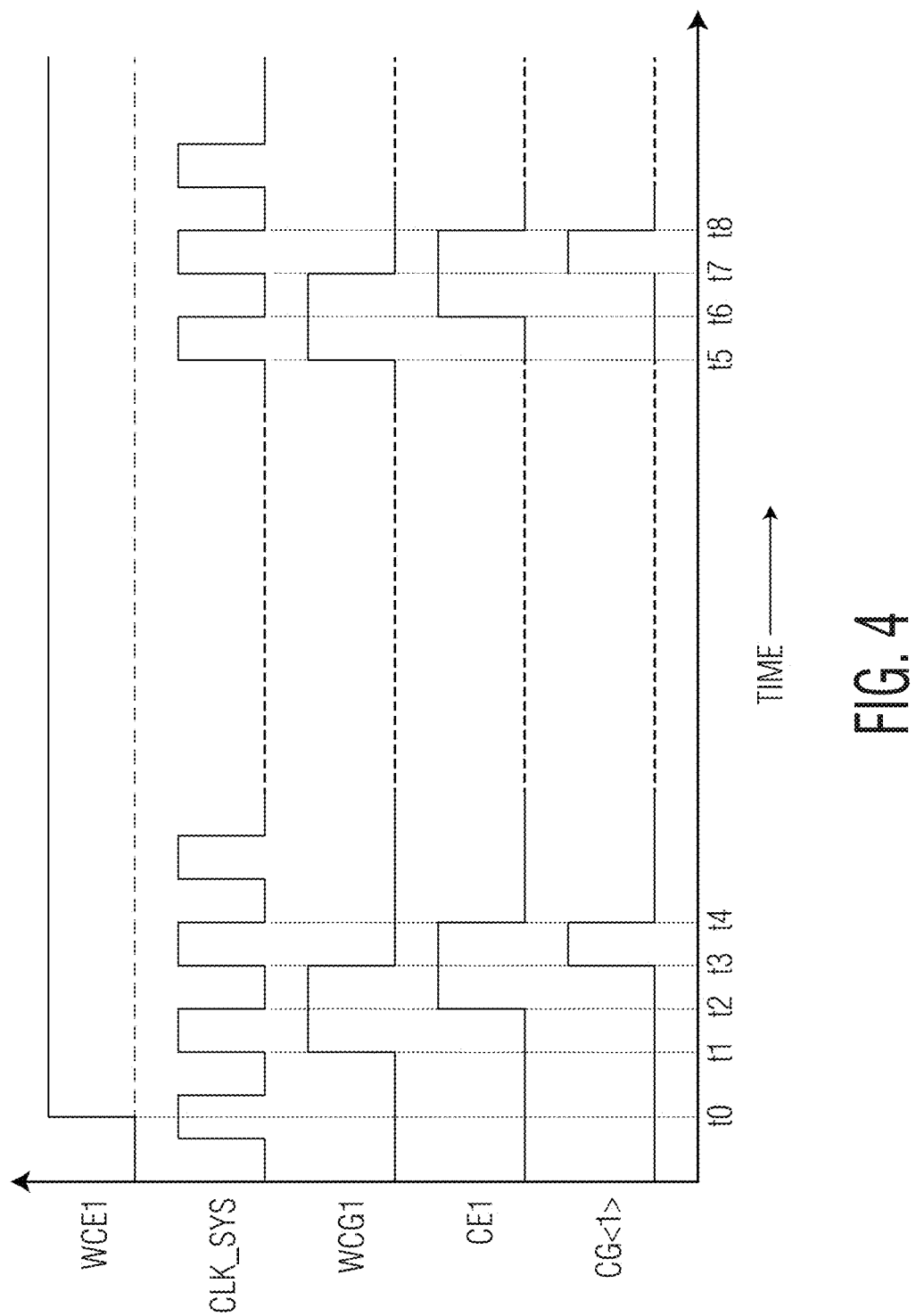
FIG. 4 is a timing diagram illustrating operation of the clock control circuit of FIG. 1 performing watch clocking when enabled for the peripheral block PER<1> according to one embodiment.

FIG. 4 is a timing diagram illustrating operation of the clock control circuit 306 performing watch clocking when enabled for the peripheral block PER<1> according to one embodiment. WCE1, CLK_SYS, WCG1, CE1, and CG<1> are plotted versus time. In this case, it is assumed that CLK_SYS for PER<1> is disabled (SCE1 is low) and that CLK_REQ<1> remains low since either of these conditions override watch clocking. Logic or other circuitry delays are ignored in the timing diagram for purposes of simplicity of illustration and explanation. At an initial time t0, WCE1 is shown asserted high to enable watch clocking for PER<1>. At subsequent time t1, the watch clock generator 304 asserts WCG1 high coincident with a rising edge of CLK_SYS. Upon the next falling edge of CLK_SYS at a time t2, the DFF 342 asserts CE1 high. Upon the next rising edge of CLK_SYS at a time t3, CG<1> is asserted high while CE1 and CLK_SYS are both high. Also, WCG1 goes back low at about time t3. Upon the next falling edge of CLK_SYS at a time t4, CLK_SYS goes low so that CG<1> is also pulled back low. CG<1> remains low until the watch clock generator 304 next asserts WCG1 high.

In this case, due to operation of the watch clock generator 304, only one pulse of CLK_SYS is gated through to CG<1> each time WCG1 is asserted high for one cycle of CLK_SYS. The watch clocking factor M determines the number of CLK_SYS cycles that are counted before WCG1 is next asserted high. As shown, for example, later at a subsequent time t5 WCG1 is asserted high again for one CLK_SYS cycle, causing CE1 to go high for one CLK_SYS cycle beginning at time t6, resulting in another clock pulse on CG<1> between times t7 and t8. Operation repeats in this manner for subsequent assertions of WCG1 according to watch clocking operation.

Referring back to FIG. 3, the value of M determines the number of CLK_SYS cycles between assertion of clock pulses on CG<1>. For M=3, a clock pulse is asserted on CG<1> after every $2^3=8$ cycles of CLK_SYS, for M=4, a clock pulse is asserted on CG<1> after every $2^4=16$ cycles of CLK_SYS, M=5, a clock pulse is asserted on CG<1> after every $2^5=32$ cycles of CLK_SYS, and so on. The maximum delay between CG<1> clock pulses is $2^8=256$ cycles of CLK_SYS for M=8 for an 8-bit counter 320. The size of the counter 320 (e.g., the number of bits) may be increased to achieve larger watch clocking pulse delays. For example, a 10-bit counter may be used to achieve a maximum delay of $2^{10}=1024$ cycles of CLK_SYS (i.e., M=10) if desired.

Operation of each of the clock control circuits 310 and 314 and any additional clock control circuits is substantially the same. If each of the clock control circuits were responsive to the same watch clock gate signal WCG1, however, then each of the peripheral blocks 102 would be clocked simultaneously during watch clocking operation resulting in simultaneous peaks of the power consumption visible in the power profile. Such synchronous watch clocking operation could enable a potential physical attack surface as it allows attacker to synchronize attacks to the power consumption peaks visible in the power profile. Instead, subsequent watch clock gate signals may be skewed relative to WCG1. The delay circuit 308 delays WCG2 by the delay amount DEL1 so that watch clocking of CG<2> by the clock control circuit 310 is skewed by DEL1 relative to CG<1>. Similarly, the delay circuit 312 delays WCG3 by the delay amount DEL2 so that watch clocking of CG<3> by the clock control circuit 314 is skewed by DEL2 relative to CG<2>, and so on.

The delays DEL1, DEL2, etc., of the delay circuits 308, 312, etc., respectively, may be equal so that watch clock skewing between the clock control circuits 306, 310, 314, etc., is uniformly distributed if desired. Alternatively, the delays may be different, such as being randomly or pseudo-randomly distributed to potentially achieve a more uniform power consumption profile if needed. Each of the delay circuits 308, 312, etc., may be implemented as one or more shift registers or the like as further described herein.

The illustrated CRG 300 is shown with only one watch clock generator 304 used for generating watch clock pulses based on the watch clock factor M for one or more up to all N of the peripheral blocks 102 if desired. If only one watch clocking gate circuit were provided or otherwise used, then watch clocking for each of the gated clock signals has the same frequency even when skewed. In an alternative embodiment, the peripheral blocks 102 may be subdivided into different watch clocking groups and a separate watch clocking gate circuit (each similar to the watch clock generator 304) may be provided for each group. In this case, the different watch clocking gate circuits include a separate programmable register similar to the programmable register 324 for storing a different one of multiple watch clock factors, e.g., M1, M2, M3, and so on.

Although not shown, a power controller or the like, which may be externally coupled, located within the processing system 100, or located within the CRG 104, programs enable values into the enable registers (e.g., registers 330, 332, 502, 510, 512, 524, 526, 530, 538, 540, 554, 556, etc.) to control the power mode of operation and watch clocking operation of each of the peripheral blocks 102. For example, the power controller programs the register 330 to enable or disable the system clock provided to the peripheral block PER<1> to switch between normal and low power modes of operation. Also, the power controller programs the register 332 to enable or disable watch clocking operation of the peripheral block PER<1> during the low power mode. In this manner, when watch clocking is enabled for a peripheral block PER<1>, watch clocking operation is overridden by the system clock when enabled, such as during normal operation, and is automatically operative when the system clock is disabled, such as during the low power mode of the peripheral block PER<1>. Watch clocking may be disabled for any of the peripheral blocks 102 that do not include security information to minimize power consumption.

Figure 5:
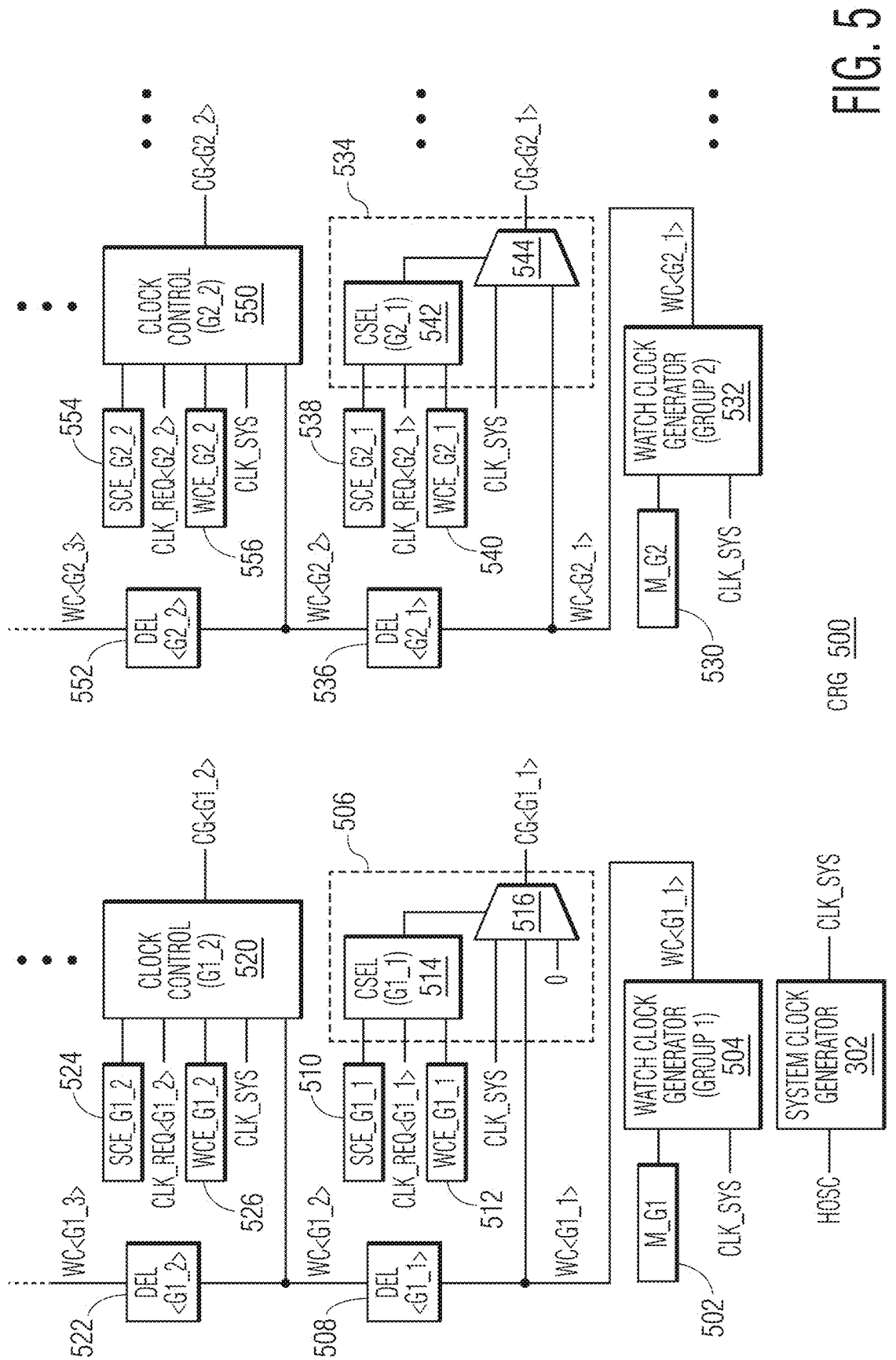
FIG. 5 is a simplified schematic and block diagram of another clock and reset generator (CRG) implemented according to another embodiment which may be used as the CRG of FIG. 1, in which the peripheral blocks of FIG. 1 are separated into one or more different groups for operating with different programmable watch clocks.

FIG. 5 is a simplified schematic and block diagram of another clock and reset generator (CRG) 500 implemented according to another embodiment which may be used as the CRG 104, in which the peripheral blocks 102 are separated into one or more different groups for operating with different programmable watch clocks. The system clock generator 302 is included which receives HOSC and which provides the system clock signal CLK_SYS. The programmable register 502 stores a watch clock factor M_G1 for a group referred to as group 1. M_G1 and CLK_SYS are provided to a watch clock generator 504, which provides a watch clock gate signal WC<G1_1> for group 1. It is noted that the numeric value G1_1 maps to any one of the N peripheral blocks PER<1>-PER<N> allocated into group 1, in which the mapped peripheral block may be referred to as PER<G1_1>. The watch clock generator 504 may be configured in a similar manner as the watch clock generator 304 previously described.

WC<G1_1> is provided to an input of a clock control circuit 506 and to an input of a delay circuit 508 having a delay DEL<G1_1> and having an output providing a delayed watch clock gate signal WC<G1_2>. The programmable register 510 stores a system clock enable value SCE_G1_1 and programmable register 512 stores a watch clock enable value WCE_G1_1. SCE_G1_1, WCE_G1_1, and a corresponding clock request signal CLK_REQ<G1_1> are provided to respective inputs of a clock select (CSEL) circuit 514 of the clock control circuit 506 for the first peripheral block of group 1 (G1_1). The CSEL circuit 514 has an output provided to a select input of a multiplexer (MUX) 516 of the clock control circuit 506, in which the MUX 516 receives CLK_SYS, WC<G1_1>, and a digital zero value "0" at respective inputs and which provides a corresponding gated clock signal CG<G1_1> to the clock input of the peripheral block PER<G1_1> of group 1.

Operation of the clock control circuit 506 is now described. Again, the power controller programs enable values into the enable registers 502, 510, 512, 524, 526, 530, 538, 540, 554, 556, etc.) to control the power mode of operation and watch clocking operation of each of the peripheral blocks 102. When the system clock enable value SCE_G1_1 is a logic value "1" or while CLK_REQ<G1_1> is asserted high, then the CSEL circuit 514 asserts its output so that the MUX 516 selects CLK_SYS as CG<G1_1>. In either case the peripheral block PER<G1_1> receives CLK_SYS and operates normally.

When the system clock enable value SCE_G1_1 is a logic value "0" and while CLK_REQ<G1_1> remains negated low, and if the watch clock enable value WCE_G1_1 is also a logic "0" to disable watch clocking, then the CSEL circuit 514 asserts its output so that the MUX 516 selects logic "0" as CG<G1_1> to effectively disable the clock of the corresponding peripheral block PER<G1_1>. In this case the peripheral block PER<G1_1> is effectively disabled for low power operation. This configuration is suitable for minimizing power consumption for low power operation for those peripherals without security information. However, if the peripheral block PER<G1_1> includes corresponding security information (e.g., SEC<G1_1>), then the security information may remain susceptible to exposure in an attack during the low power mode.

It is noted that the MUX 516 may be simplified and configured without the logic "0" input so that only the CLK_SYS or a corresponding watch clock signal (e.g., WC<G1_1>) are selected. In one embodiment, only those peripheral blocks 102 that include security information are allocated into one of the different groups for operating with corresponding programmable watch clocks. Remaining peripheral blocks 102 that do not include security information are excluded since watch clocking is not needed or otherwise not used.

When the system clock enable value SCE_G1_1 is a logic value "0" and while CLK_REQ<G1_1> remains negated low, and if the watch clock enable value WCE_G1_1 is a logic "1" to enable watch clocking, then the CSEL circuit 514 asserts its output so that the MUX 516 selects the watch clock signal WC<G1_1> as the CG<G1_1>. In this case, the peripheral block PER<G1_1> is clocked at a much-reduced duty cycle based on the watch clock factor M-G1 to ensure that errors are clocked through to a top system level while only adding minimal additional power. Any attacks on the peripheral block PER<G1_1> are thus detected by the top level system.

The delayed watch clock signal WC<G1_2> is provided to an input of a clock control circuit 520 and to an input of a delay circuit 522 having a delay DEL<G1_2> and having an output providing another delayed watch clock gate signal WC<G1_3>. The numeric value G1_2 maps to any other one of the N peripheral blocks PER<1>-PER<N> allocated into group 1, in which the mapped peripheral block is referred to as PER<G1_2>. The programmable register 524 stores a system clock enable value SCE_G1_2 and the register 526 stores a watch clock enable value WCE_G1_2. SCE_G1_2, WCE_G1_2, and a corresponding clock request signal CLK_REQ<G1_2> are provided to respective inputs of the clock control circuit 520 for a second peripheral block of group 1 (G1_2). The clock control circuit 520 is configured in substantially the same manner as the clock control circuit 506 including a CSEL circuit and a MUX (not shown) for selecting either CLK_SYS, WC<G1_2>, or no clock as a corresponding gated clock signal CG<G1_2> to the clock input of the peripheral block PER<G1_2> of group 1.

Operation of the clock control circuit 520 is substantially the same as operation of the clock control circuit 506 previously described. The SCE_G1_2 value stored in the register 524 may be used to enable or disable CLK_SYS provided to the peripheral block PER<G1_2>. If so equipped, the peripheral block PER<G1_2> may assert CLK_REQ<G1_2> to request that CLK_SYS be provided. The WCE_G1_2 value stored in the register 526 may be used to enable or disable the watch clock WC<G1_2> provided to the peripheral block PER<G1_2>. When watch clocking is enabled (i.e., when WCE_G1_2=logic "1") and when the SCE_G1_2 value disables CLK_SYS and while CLK_REQ<G1_2> is not asserted, the watch clock signal WC<G1_2> is provided as the gated clock signal CG<G1_2> to the peripheral block PER<G1_2>.

The programmable register 530 stores another watch clock factor M_G2 for another group referred to as group 2. M_G2 may be different than M_G1 to provide a different rate of watch clock pulses for group 2. M_G2 and CLK_SYS are provided to another watch clock generator 532, which provides another watch clock gate signal WC<G2_1> for group 2. Again, the numeric value G2_1 maps to any one of the N peripheral blocks PER<1>-PER<N> allocated into group 2, in which the mapped peripheral block may be referred to as PER<G2_1>. The watch clock generator 532 may be configured in a similar manner as the watch clock generator 304 previously described.

WC<G2_1> is provided to an input of another clock control circuit 534 and to an input of a delay circuit 536 having a delay DEL<G2_1> and having an output providing a delayed watch clock gate signal WC<G2_2>. The programmable register 538 stores a system clock enable value SCE_G2_1 and the programmable register 540 stores a watch clock enable value WCE_G2_1. SCE_G2_1, WCE_G2_1, and a corresponding clock request signal CLK_REQ<G2_1> are provided to respective inputs of a clock select (CSEL) circuit 542 of the clock control circuit 534 for the peripheral block of group 2 (G2_1). The CSEL circuit 542 has an output provided to a select input of a MUX 544 of the clock control circuit 534, in which the MUX 544 receives CLK_SYS and WC<G2_1> at respective inputs and which provides a corresponding gated clock signal CG<G2_1> to the clock input of the peripheral block PER<G2_1> of group 2. In this case, the MUX 544 is simplified and configured without a logic "0" input. It is noted that those peripherals without security information may be excluded from the watch clocking groups and receive a clock signal that may be shut down indefinitely without watch clocking operation.

The delayed watch clock signal WC<G2_2> is provided to an input of a clock control circuit 550 and to an input of a delay circuit 552 having a delay DEL<G2_2> and having an output providing another delayed watch clock gate signal WC<G2_3>. The numeric value G2_2 maps to any other one of the N peripheral blocks PER<1>-PER<N> allocated into group 2, in which the mapped peripheral block is referred to as PER<G2_2>. The programmable register 554 stores a system clock enable value SCE_G2_2 and the register 556 stores a watch clock enable value WCE_G2_2. SCE_G2_2, WCE_G2_2, and a corresponding clock request signal CLK_REQ<G2_2> are provided to respective inputs of the clock control circuit 550 for a second peripheral block of group 2 (G2_2). The clock control circuit 550 is configured in substantially the same manner as the clock control circuit 534 including a CSEL circuit and a MUX (not shown) for selecting either CLK_SYS or WC<G2_2> as a corresponding gated clock signal CG<G2_2> to the clock input of the peripheral block PER<G2_2> of group 2.

Operation of the clock control circuit 534 is not further described but is substantially similar as the clock control circuit 506 previously described except that the MUX 544 does not include the logic "0" input. Also, the rate of the watch clock pulses may be different based on the watch clock factor M_G2. Operation of the clock control circuit 550 is not further described but is substantially the same as the clock control circuit 534 and similar to the clock control circuit 506 previously described.

Figure 6:
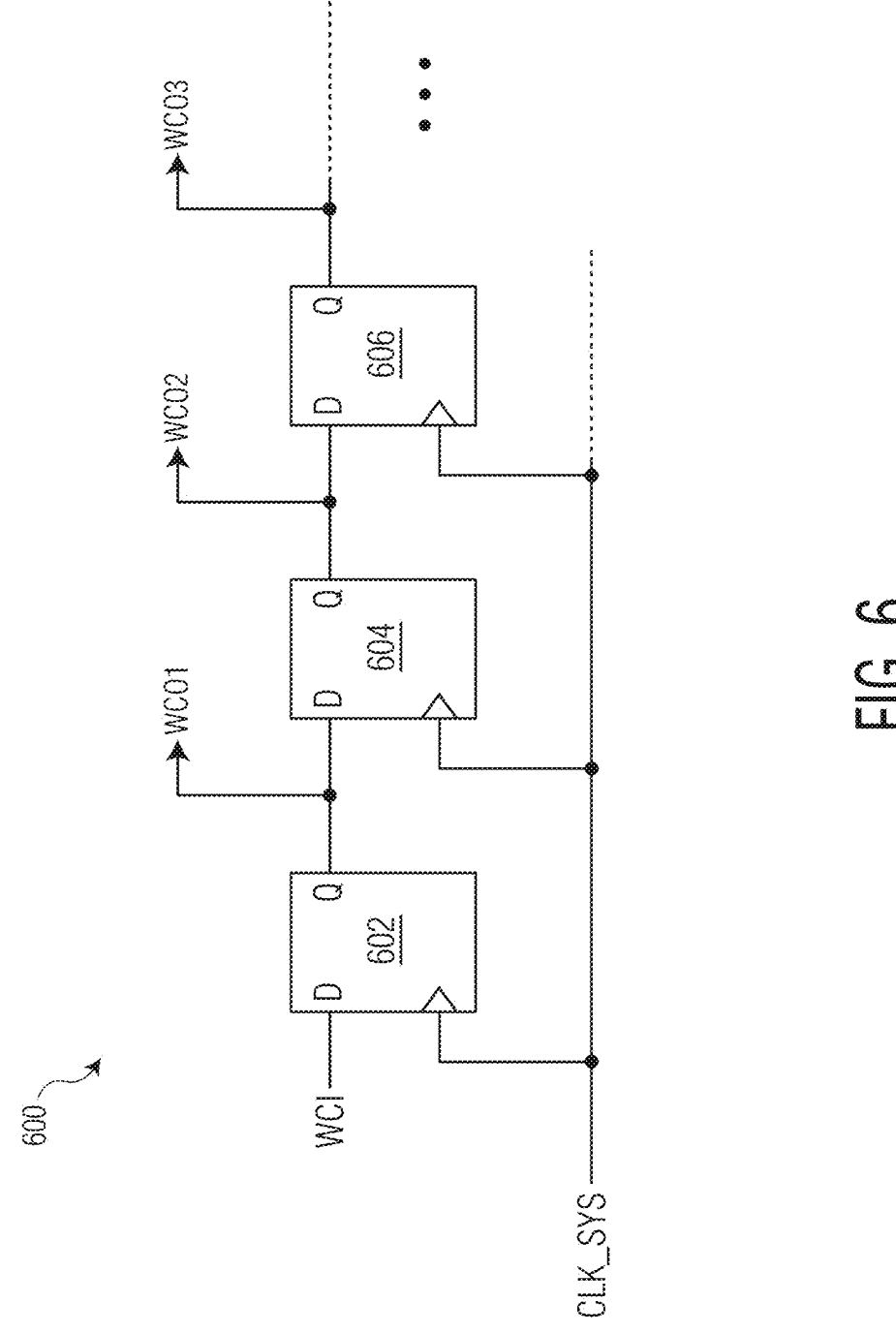
FIG. 6 is a simplified schematic of a delay circuit implemented according to one embodiment which may be used as any of the delay circuits of any of the CRGs.

FIG. 6 is a simplified schematic of a delay circuit 600 implemented according to one embodiment which may be used as any of the delay circuits previously described, such as the delay circuits 308, 312, 508, 522, 536, and 552. The illustrated delay circuit 600 is configured as a shift register including one or more DFFs 602, 604, 606, etc., depending upon the desired amount of delay. Although 3 DFFs are shown, it is understood that more or less DFFs may be included, such as a single DFF, a sequential pair of DFFs, an array of more than 3 DFFs, etc. Each of the DFFs includes a clock input receiving an appropriate clock signal, such as, for example, CLK_SYS as shown. An input watch clock signal WCI is provided to the D input of the first DFF 602, which outputs a first delayed watch clock signal WCO1. If additional delay is desired, WCO1 is provided to the input of the second DFF 604, which outputs a second delayed watch clock signal WCO2. If additional delay is desired, WCO2 is provided to the input of the third DFF 606, which outputs a third delayed watch clock signal WCO3, and so on. In this case, each subsequent watch clock signal is delayed by one or more cycles of CLK_SYS from a previous watch clock signal. As previously described, subsequent sequential delayed watch clock signals may be skewed relative to a first or master watch clock signal (e.g., WCG1, WC<G1_1>, WC<G2_1>, etc.) to avoid peaks in the power consumption profile to thwart synchronous attacks of the peripheral blocks 102 containing security information.

Each delay in any given group may be the same for uniform skewing or may be different for non-uniform skewing from one peripheral to the next. In one embodiment, each delay circuit may be fixed or hardwired to implement a preselected or predetermined delay. In an alternative embodiment, the power controller or other clock controller (not shown) may be configured to program a register or the like to control the corresponding delay of one or more of the delay circuits, such as by selecting one of the delayed watch clock signals WCO1, WCO2, WCO3, etc., for each delay circuit.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage or error levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A processing system, comprising:
a peripheral configured to store security information and having a clock input receiving a gated clock;
a watch clock generator configured to generate a watch clock that has a reduced duty cycle relative to a system clock; and
clock control circuitry configured to select the system clock as the gated clock during normal operation of the peripheral and to select the watch clock as the gated clock during a low power mode of the peripheral,
wherein the watch clock generator comprises:
a counter configured to count cycles of the system clock and to provide a count value indicative thereof; and
a clock pulse selector comprises modulo circuitry configured to provide a pulse on the watch clock whenever the count value divided by $2^M$ equals zero in which M is a watch clock factor.

2. The processing system of claim 1, wherein the clock pulse selector is configured to provide the pulse on the watch clock for every $2^M$ pulses of the system clock.

3. The processing system of claim 1, wherein the clock control circuitry is configured to select the system clock as the gated clock when the system clock enabled and to select the watch clock as the gated clock when the watch clock is enabled while the system clock is disabled.

4. The processing system of claim 1, wherein the clock control circuitry is configured to select the system clock as the gated clock when the system clock is enabled or while a clock request signal from the peripheral is asserted and that selects the watch clock as the gated clock when the watch clock is enabled and the system clock is disabled and when the clock request signal from the peripheral is negated.

5. The processing system of claim 1, further comprising:
a second peripheral configured to store security information and having a clock input receiving a second gated clock;
delay circuitry configured to delay the watch clock and to provide a delayed watch clock; and
wherein the clock control circuitry is configured to select the system clock as the second gated clock during normal operation of the second peripheral and to select the delayed watch clock as the second gated clock during a low power mode of the second peripheral.

6. The processing system of claim 5, wherein the delay circuitry comprises a shift register.

7. The processing system of claim 1, further comprising:
the peripheral comprising one of a plurality of peripherals each configured to store security information and each having a clock input receiving a corresponding one of a plurality of gated clocks;
delay circuitry configured to delay the watch clock and to provide a plurality of delayed watch clocks each skewed relative to each other; and
wherein the clock control circuitry is configured to select the system clock as the gated clock of a corresponding one of the plurality of peripherals during normal operation of the corresponding peripheral and to select a corresponding one of the plurality of delayed watch clocks as the gated clock during a low power mode of the corresponding peripheral.

8. The processing system of claim 1, further comprising:
the peripheral comprising one of a plurality of peripherals each configured to store security information and each having a clock input receiving a corresponding one of a plurality of gated clocks, wherein the plurality of peripherals are subdivided into a plurality of groups;
wherein the watch clock generator comprises one of a plurality of watch clock generators each configured to generate a corresponding one of a plurality of primary watch clocks each having a corresponding one of a plurality of different reduced duty cycles relative to the system clock, wherein each of the plurality of watch clock generators generates a corresponding primary watch clock for a corresponding one of the plurality of groups;
delay circuitry configured to delay each of the plurality of primary watch clocks and to provide a plurality of delayed watch clocks that are skewed relative to each other for each of the plurality of groups; and
wherein the clock control circuitry is configured to select the system clock as the gated clock of a corresponding one of the plurality of peripherals during normal operation of the corresponding peripheral and to select a corresponding one of the plurality of primary watch clocks or a corresponding one of the plurality delay watch clocks as the gated clock during a low power mode of the corresponding peripheral.

9. A method, comprising:
in a processing system comprising a peripheral configured to store security information and having a clock input receiving a gated clock:
generating a watch clock that has a reduced duty cycle relative to a system clock; and
selecting the system clock as the gated clock during normal operation of the peripheral and selecting the watch clock as the gated clock during a low power mode of the peripheral,
wherein the generating the watch clock comprises:
counting cycles of the system clock and providing a count value indicative thereof; and
providing a pulse on the watch clock whenever the count value divided by $2^M$ equals zero in which Mis a watch clock factor.

10. The method of claim 9, wherein the providing comprises providing the pulse on the watch clock for every $2^M$ pulses of the system clock.

11. The method of claim 9, wherein the selecting comprises selecting the system clock as the gated clock when the system clock is enabled and selecting the watch clock as the gated clock when the watch clock is enabled while the system clock is disabled.

12. The method of claim 9, wherein the selecting comprises selecting the system clock as the gated clock when the system clock is enabled or while a clock request signal from the peripheral is asserted and selecting the watch clock as the gated clock when the watch clock is enabled and the system clock is disabled and when the clock request signal from the peripheral is negated.

13. The method of claim 9, wherein the processing system comprises a second peripheral configured to store security information and having a clock input for receiving a second gated clock, further comprising:
delaying the watch clock and providing a delayed watch clock; and
selecting the system clock as the second gated clock during normal operation of the second peripheral and selecting the delayed watch clock as the second gated clock during a low power mode of the second peripheral.

14. The method of claim 13, wherein the delaying comprises shifting the watch clock through a shift register clocked by the system clock and providing at least one delayed watch clock.

15. The method of claim 9, wherein the peripheral comprises one of a plurality of peripherals each configured to store security information and each having a clock input receiving a corresponding one of a plurality of gated clocks, the method further comprising:

delaying the watch clock and providing a plurality of delayed watch clocks each skewed relative to each other; and selecting the system clock as the gated clock of a corresponding one of the plurality of peripherals during normal operation of the corresponding peripheral and selecting a corresponding one of the plurality of delayed watch clocks as the gated clock during a low power mode of the corresponding peripheral.

16. The method of claim 9, wherein the peripheral comprises one of a plurality of peripherals each configured to store security information and each having a clock input receiving a corresponding one of a plurality of gated clocks, and wherein the plurality of peripherals are subdivided into a plurality of groups, the method further comprising:

generating a corresponding one of a plurality of primary watch clocks for each of the plurality of groups, each of the plurality of primary watch clocks having a corresponding one of a plurality of different reduced duty cycles relative to the system clock;

delaying each of the plurality of primary watch clocks and providing a plurality of delayed watch clocks that are skewed relative to each other for each of the plurality of groups; and selecting the system clock as the gated clock of a corresponding one of the plurality of peripherals during normal operation of the corresponding peripheral and selecting a corresponding one of the plurality of primary watch clocks or a corresponding one of the plurality delay watch clocks as the gated clock during a low power mode of the corresponding peripheral.

* * * * *